(12) United States Patent
Conlon et al.

(10) Patent No.: US 9,017,200 B2
(45) Date of Patent: Apr. 28, 2015

(54) FLEXIBLE HYBRID TRANSMISSION WITH CONFIGURABLE MOTOR WINDING AND DECLUTCHING STRATEGY TO PROVIDE ELECTRIC VEHICLE AND HYBRID FUNCTIONS

(75) Inventors: Brendan M. Conlon, Rochester Hills, MI (US); Peter J. Savagian, Bloomfield Hills, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 803 days.

(21) Appl. No.: 13/272,449

(22) Filed: Oct. 13, 2011

(65) Prior Publication Data

US 2013/0095970 A1    Apr. 18, 2013

(51) Int. Cl.
| | |
|---|---|
| *F16H 3/72* | (2006.01) |
| *B60K 6/387* | (2007.10) |
| *B60K 6/445* | (2007.10) |
| *B60K 6/26* | (2007.10) |
| *B60K 6/38* | (2007.10) |

(52) U.S. Cl.
CPC ............... *B60K 6/387* (2013.01); *B60K 6/445* (2013.01); *Y02T 10/6239* (2013.01); *B60K 6/26* (2013.01); *B60K 2006/381* (2013.01)

(58) Field of Classification Search
USPC ............................................... 475/5, 271, 290
See application file for complete search history.

(56) References Cited

U.S. PATENT DOCUMENTS

| | | | | |
|---|---|---|---|---|
| 7,422,535 | B2 * | 9/2008 | Raghavan et al. | 475/5 |
| 7,597,648 | B2 | 10/2009 | Conlon et al. | |
| 7,691,021 | B2 * | 4/2010 | Cho et al. | 475/5 |
| 7,980,980 | B2 | 7/2011 | Rask et al. | |
| 2009/0033159 | A1 * | 2/2009 | West et al. | 310/50 |

* cited by examiner

*Primary Examiner* — Derek D Knight
(74) *Attorney, Agent, or Firm* — Quinn Law Group, PLLC

(57) ABSTRACT

A powertrain includes a first electric motor, a second electric motor and a transmission. The first electric motor includes an interchangeable winding set to provide the required power for the specific propulsion configuration utilized to propel the vehicle, i.e., a hybrid propulsion configuration or a full electric propulsion configuration. The transmission is operable in different powerflows to support operation of the powertrain in either of the hybrid propulsion configuration or the full electric propulsion configuration. The same powertrain may be used for either the hybrid propulsion configuration or the full electric propulsion configuration by switching the specific winding set installed into the first electric motor.

14 Claims, 1 Drawing Sheet

_US 9,017,200 B2_

FLEXIBLE HYBRID TRANSMISSION WITH CONFIGURABLE MOTOR WINDING AND DECLUTCHING STRATEGY TO PROVIDE ELECTRIC VEHICLE AND HYBRID FUNCTIONS

TECHNICAL FIELD

The invention generally relates to a powertrain for a vehicle, and more specifically to a transmission for the powertrain and to a method of assembling the powertrain of the vehicle.

BACKGROUND

Vehicles include a drivetrain that may include a charge sustaining or charge depleting (CS/CD) hybrid propulsion configuration (which may or may not be designed to accept battery charge power from an external electric energy source, i.e., a plug in hybrid) or a range extended full electric propulsion configuration to propel the vehicle. In either configuration, the drivetrain includes an internal combustion engine, a first electric motor, a second electric motor and a transmission. The range extended full electric configuration, used in an extended range electric vehicle (EREV), must be capable of propelling the vehicle on battery power alone until the battery charge is depleted. At that time it transitions to an operating strategy similar to a conventional hybrid in which the engine is operated during some driving conditions to provide drive power and maintain battery state-of-charge. The CS/CD hybrid configuration generally requires the engine to operate in order to provide full vehicle power, and is designed to be capable of operating as an electric vehicle only at lower powers. Generally, the first electric motor includes an electric motor/generator, and may be actuated from torque from the internal combustion engine to charge a battery. In a hybrid propulsion configuration, vehicle propulsion may come from any of the internal combustion engine, the first electric motor, the second electric motor, or any combination thereof. Hybrid propulsion configurations generally require a larger internal combustion engine, and utilize smaller batteries than vehicles utilizing the full electric propulsion configuration. For example, a passenger car vehicle utilizing the full electric propulsion configuration may include a battery having a power output of greater than 100 KW, whereas vehicles utilizing the hybrid propulsion configuration may only require a battery having a power output of between 30 and 40 KW.

The different operating strategies between the differing propulsion systems lead to substantially different usage of the electric motors. For example, the electric motors of the full electric propulsion configuration tend to operate at higher speeds and higher powers during operation as an electric vehicle, whereas electric motors of the hybrid propulsion configuration tend to operate at lower speeds and lower powers. Additionally, the second electric motor in a full electric propulsion configuration typically requires a high torque capability to provide adequate launch and reverse gradeability performance. The high torque required from the second electric motor tends to reduce the power and efficiency of the second electric motor at high speeds. Accordingly, the full electric propulsion configuration and the hybrid propulsion configuration generally employ different transmission powerflows, and utilize different electric motors. The electric motors may vary in the number of winding turns and/or the winding connection configuration, in order to provide the required performance characteristics for the specific propulsion configuration utilized.

SUMMARY

A powertrain for a vehicle is provided. The powertrain includes a first electric motor, a second electric motor, an internal combustion engine, and a transmission. The transmission includes an output that transmits a torque to at least one wheel of the vehicle, a first planetary gearset in torque transmitting communication with the output, the first electric motor and the internal combustion engine, and a second planetary gearset in torque transmitting communication with the output and the second electric motor. The transmission further includes a first torque transmitting mechanism and a second torque transmitting mechanism. The first torque transmitting mechanism selectively engages and disengages the second planetary gearset. The first torque transmitting mechanism provides a reaction torque to the second planetary gearset when the first torque transmitting mechanism is engaged to allow the second electric motor to transmit full power through the second planetary gearset to the output. The second torque transmitting mechanism selectively couples and de-couples the first electric motor and the second planetary gearset.

A transmission for a vehicle having an internal combustion engine, a first electric motor and a second electric motor is also provided. The transmission includes an output that transmits a torque to at least one wheel of the vehicle, a first planetary gearset in torque transmitting communication with the output, the first electric motor and the internal combustion engine, and a second planetary gearset in torque transmitting communication with the output and the second electric motor. The first planetary gearset and the second planetary gearset are each configured to provide independent fixed ratio paths to the output for the first electric motor and the second electric motor respectively. The transmission further includes a first torque transmitting mechanism, a second torque transmitting mechanism and a third torque transmitting mechanism. The first torque transmitting mechanism selectively engages and disengages the second planetary gearset. The first torque transmitting mechanism provides a reaction torque to the second planetary gearset when the first torque transmitting mechanism is engaged to allow the second electric motor to transmit full power through the second planetary gearset to the output. The second torque transmitting mechanism selectively couples and de-couples the first electric motor and the second planetary gearset. The third torque transmitting mechanism selectively engages and disengages the first planetary gearset. The third torque transmitting mechanism provides a reaction torque to the first planetary gearset when the third torque transmitting mechanism is engaged to allow the first electric motor to transmit full power through the first planetary gearset to the output when the internal combustion engine is off. When the internal combustion engine is off, the transmission may operate in a first electric mode, in which the third torque transmitting mechanism and the first torque transmitting mechanism are engaged, and the second torque transmitting mechanism is disengaged. When in the first electric mode, the transmission engages both the first electric motor and the second electric motor simultaneously to provide vehicle propulsion. When the internal combustion engine is off, the transmission may further operate in a second electric mode, in which the second torque transmitting mechanism and the first torque transmitting mechanism are disengaged, and the third torque transmitting mechanism is engaged. When in the second electric mode, the transmission provides vehicle propulsion with only the first electric motor, and disconnects the second electric motor from the first electric motor. The transmission may further operate in a third mode, in which the second torque transmitting mechanism and the third torque transmitting mechanism are disengaged, and the first torque transmitting mechanism is engaged. When in the third mode, the transmission provides vehicle propulsion from the second electric motor.

A method of assembling a powertrain of a vehicle is also provided. The method includes providing a transmission. The transmission includes an output that transmits a torque to at least one wheel of the vehicle, a first planetary gearset in torque transmitting communication with the output, the first electric motor and the internal combustion engine, and a second planetary gearset in torque transmitting communication with the output and the second electric motor. The transmission further includes a first torque transmitting mechanism, a second torque transmitting mechanism and a third torque transmitting mechanism. The first torque transmitting mechanism selectively engages and disengages the second planetary gearset. The first torque transmitting mechanism provides a reaction torque to the second planetary gearset when the first torque transmitting mechanism is engaged to allow the second electric motor to transmit full power through the second planetary gearset to the output. The second torque transmitting mechanism selectively couples and de-couples the first electric motor and the second planetary gearset. The third torque transmitting mechanism selectively engages and disengages the first planetary gearset. The third torque transmitting mechanism provides a reaction torque to the first planetary gearset when the third torque transmitting mechanism is engaged to allow the first electric motor to transmit full power through the first planetary gearset to the output when the internal combustion engine is off. One of a hybrid propulsion configuration and a full electric propulsion configuration is identified as the propulsion configuration to be used to propel the vehicle. One of a plurality of different winding sets is installed into a first electric motor to optimize performance of the vehicle. The one of the plurality of winding sets that is installed is based upon which of the hybrid propulsion configuration and the full electric propulsion configuration is identified as to be used to propel the vehicle.

Accordingly, the transmission of the powertrain provides a powerflow that is suitable for both a hybrid propulsion configuration, in which the electric motors and the internal combustion engine may be used alone or in combination to provide propulsion for the vehicle, or in a full electric propulsion configuration in which the first and second electric motors are used to provide propulsion for the vehicle, and the internal combustion engine is used to provide torque to charge a battery. Therefore, by simply installing an appropriate winding set into the first electric motor that is suitable for the specific propulsion configuration to be used, the powertrain may be utilized for either the hybrid propulsion configuration or the full electric configuration, thereby providing increased commonality of parts and reduced manufacturing costs.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a powertrain is generally shown at 20. The powertrain 20 is for a vehicle, such as but not limited to a hybrid vehicle, in which a combination of an internal combustion engine 26 and an electric motor are used to power the vehicle; or a full electric vehicle, in which one or more electric motors are used to power the vehicle and an internal combustion engine 26 provides torque to a generator to charge an electric vehicle battery 30.

Figure 1:
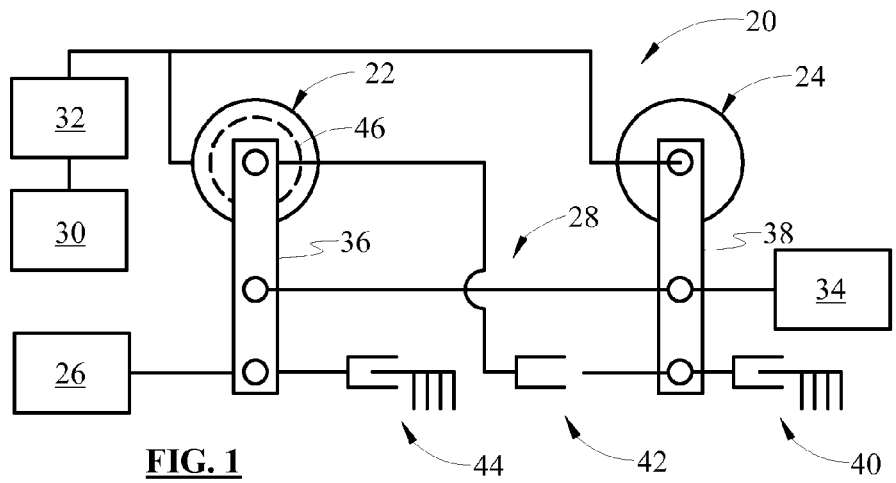
FIG. 1 is a schematic lever diagram of a powertrain of a vehicle in a first operating mode.
Figure 2:
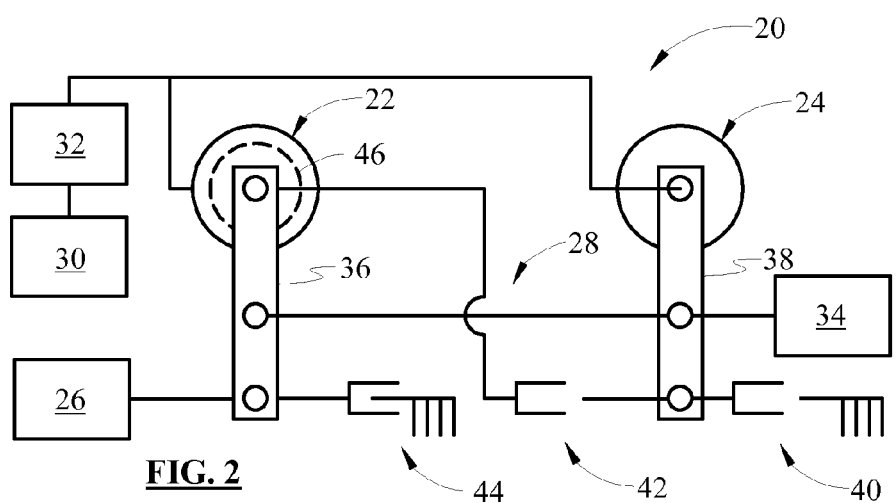
FIG. 2 is a schematic lever diagram of the powertrain in a second operating mode.
Figure 3:
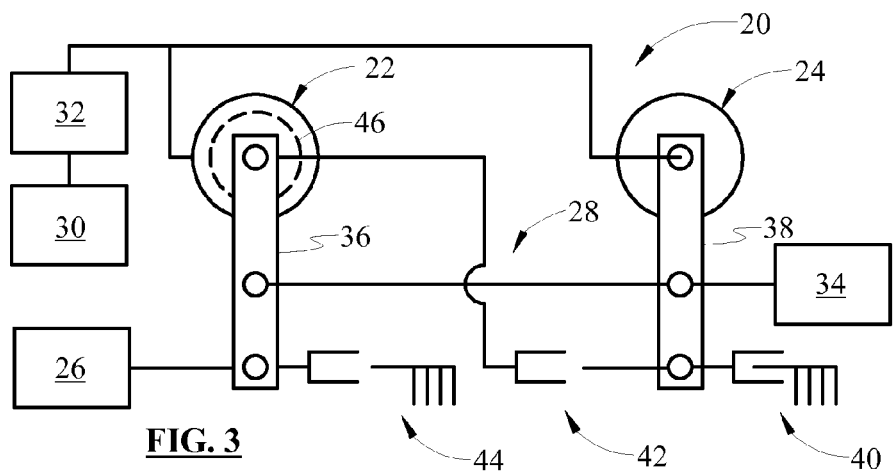
FIG. 3 is a schematic lever diagram of the powertrain in a third operating mode.

Referring to FIGS. 1 through 3, the powertrain 20 is illustrated in a lever diagram format. A lever diagram is a schematic representation of the components of a mechanical device such as an automatic transmission. Each individual lever represents a planetary gearset or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Vertical dashed lines with a grounded pivot point represent external gear sets. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

Referring to FIGS. 1 through 3, the powertrain 20 includes a first electric motor 22, a second electric motor 24, an internal combustion engine 26, and a transmission 28. Each of the first electric motor 22, the second electric motor 24 and the internal combustion engine 26 are coupled to the transmission 28, with the transmission 28 selectively interconnecting the first electric motor 22, the second electric motor 24 and the internal combustion engine 26 to provide different operating modes. The internal combustion engine 26 may include any suitably sized and configured engine, such as a gasoline engine or a diesel engine.

The powertrain 20 may further include a battery 30 and a controller 32, each coupled to both the first electric motor 22 and the second electric motor 24. The battery 30 provides power to both of the first electric motor 22 and the second electric motor 24, and receives power from a generator. It should be appreciated that the generator may be incorporated into and part of at least one of the first electric motor 22 or the second electric motor 24. The controller 32 controls the operation of the first electric motor 22 and the second electric motor 24, and may further control the operation of the transmission 28 as well. Alternatively, the powertrain 20 may include a dedicated transmission 28 controller 32 for controlling the operation of the transmission 28. The controller 32 is configured for controlling the power flow between the battery 30, the first electric motor 22 and the second electric motor 24.

The transmission 28 includes an output 34 that transmits a torque to at least one wheel of the vehicle. A first planetary gearset 36 is disposed in torque transmitting communication with the output 34, the first electric motor 22 and the internal combustion engine 26. A second planetary gearset 38 is disposed in torque transmitting communication with the output 34 and the second electric motor 24. The first planetary gearset 36 and the second planetary gearset 38 each provide independent fixed ratio paths to the output 34 for the first electric motor 22 and the second electric motor 24 respectively.

The transmission 28 further includes a first torque transmitting mechanism 40 and a second torque transmitting mechanism 42. Additionally, the transmission 28 may further include a third torque transmitting mechanism 44. The third torque transmitting mechanism 44 may be omitted if the required level of electric performance is low, and is included when the required level of electric performance is high. The first torque transmitting mechanism 40 selectively engages and disengages the second planetary gearset 38. When the first torque transmitting mechanism 40 is engaged, the first torque transmitting mechanism 40 provides a reaction torque to the second planetary gearset 38 to allow the second electric motor 24 to transmit full power through the second planetary gearset 38 to the output 34. The second torque transmitting mechanism 42 selectively couples and de-couples the first electric motor 22 and the second planetary gearset 38. The third torque transmitting mechanism 44 selectively engages and disengages the first planetary gearset 36. When the internal combustion engine 26 is off, i.e., is not running and at zero speed, and when the third torque transmitting mechanism 44 is engaged, the third torque transmitting mechanism 44 provides a reaction torque to the first planetary gearset 36 to allow the first electric motor 22 to transmit full power through the first planetary gearset 36 to the output 34.

The first torque transmitting mechanism 40, the second torque transmitting mechanism 42 and the third torque transmitting mechanism 44 may each include one of, but are not limited to a clutch, such as for example a rotating friction clutch, a one-way clutch, a dog clutch or some other similar torque transmitting mechanism. Alternatively, the first torque transmitting mechanism 40, the second torque transmitting mechanism 42 and the third torque transmitting mechanism 44 may each include one of, but are not limited to a friction clutch with a stationary component, often referred to as a brake. As shown in the Figures, the first torque transmitting mechanism 40 and the third torque transmitting mechanism 44 each include a brake, and the second torque transmitting mechanism 42 includes a clutch.

Referring to FIG. 1, the transmission 28 is operable in a first electric mode. When the transmission 28 is operating in the first electric mode, the third torque transmitting mechanism 44 and the first torque transmitting mechanism 40 are each engaged, and the second torque transmitting mechanism 42 is disengaged. When the transmission 28 is disposed in the first electric mode with the internal combustion engine 26 off, i.e., not running, both the first electric motor 22 and the second electric motor 24 simultaneously provide power to the output 34 to provide vehicle propulsion.

Referring to FIG. 2, the transmission 28 is operable in a second electric mode. When the transmission 28 is operating in the second electric mode, the second torque transmitting mechanism 42 and the first torque transmitting mechanism 40 are each disengaged, and the third torque transmitting mechanism 44 is engaged. When the transmission 28 is disposed in the second electric mode with the internal combustion engine 26 off, i.e., not running, only the first electric motor 22 is used to provide power to the output 34 to provide vehicle propulsion, with the second electric motor 24 and the internal combustion engine 26 being disconnected from the first electric motor 22.

Referring to FIG. 3, the transmission 28 is operable in a third mode. When the transmission 28 is operating in the third mode, the second torque transmitting mechanism 42 and the third torque transmitting mechanism 44 are each disengaged, and the first torque transmitting mechanism 40 is engaged. When the transmission 28 is disposed in the third mode, only the second electric motor 24 is used to provide power to the output 34 to provide the vehicle propulsion.

In addition to the three electric modes described above, the transmission 28 is also operable as a two mode input/compound spit transmission with one fixed gear. The input split mode, typically used at low vehicle speeds or high loads, is realized by engaging the first torque transmitting mechanism 40. The compound split mode, typically used at higher vehicle speed or lower loads, is realized by engaging the second torque transmitting mechanism 42. The fixed gear mode, realized by engaging both the first torque transmitting mechanism 40 and the second torque transmitting mechanism 42, may be used to propel the vehicle or to shift synchronously between the input and the compound split modes.

Each of the first electric motor 22 and the second electric motor 24 include a winding set 46. The specific configuration of the winding set 46 in each of the first electric motor 22 and the second electric motor 24 determines, among other characteristics, the torque/power relationship of the electric motor. For example, a star pattern winding configuration provides a higher torque output 34 with a lower power output 34, while a delta pattern winding configuration with the same number of winding turns provides a lower torque output 34 with a higher power output 34. In general, the second electric motor 24 of both the hybrid propulsion system and the full electric propulsion system described above utilize an electric motor having higher torque capabilities in order to provide adequate launch and reverse gradeability performance. However, the first electric motor 22 of the hybrid propulsion system and the full electric propulsion system are often configured differently, with hybrid propulsion system requiring a low speed electric motor that operates with a lower power output 34 and a higher torque output 34 for the first electric motor 22, and the full electric propulsion system requiring a high speed electric motor that operates with a higher power output 34 and a lower torque output 34 for the first electric motor 22.

In order to satisfy the requirements of both the hybrid propulsion system and the full electric propulsion system, the first electric motor 22 is configured to accept one of a plurality of different winding set 46s. The winding set 46 installed in the first electric motor 22 is chose to optimize performance in one of the hybrid propulsion configuration or the full electric propulsion configuration. The plurality of winding sets 46 may include at least two winding sets 46, i.e., a first winding set and a second winding set. The first winding set is configured to operate at a torque per amp ratio of at least 1.33 times greater than the torque per amp ratio of the second winding set. The first winding set, having the higher torque per amp ratio, thereby providing a higher torque level and a lower power level, is particularly well suited for use in the hybrid propulsion system, whereas the second winding set having the lower torque per amp ratio, thereby providing a lower torque level and a higher power level, is particularly well suited for use in the full electric propulsion system. Each of the different winding sets 46 is configured differently to provide the different torque/power outputs 34. For example, each winding set 46 may include a different number of winding turns. Alternatively, each winding set 46 may include a different winding connection configuration, such as for example, a delta pattern winding connection configuration, a star pattern winding connection configuration, a series winding connection configuration, or a parallel winding connection configuration. Accordingly, the first electric motor 22 of the powertrain 20 may be optimized for the specific propulsion system utilized, i.e., the hybrid propulsion system or the full electric propulsion system, with the different operating modes of the transmission 28 allowing the powertrain 20 to operate in either of the hybrid propulsion system or the full electric propulsion system.

A method of operating a vehicle is also provided. The method includes providing a transmission 28 as described in detail above. The method further includes identifying which of the hybrid propulsion configuration and the full electric propulsion configuration is to be used to propel the vehicle. One of the plurality of winding sets 46 is selected for installation into the first electric motor 22. The specific winding set 46 is selected based upon which of the hybrid propulsion configuration and the full electric propulsion configuration is identified as the one to be used to propel the vehicle. As described in detail above, each winding set 46 of the plurality of winding sets 46 may include a different number of winding turns, or may include a different winding connection configuration to obtain the specific torque/power output 34 needed to optimize the propulsion configuration used for the vehicle. Once the specific winding set 46 to be used in the first electric motor 22 is selected, then the selected winding set 46 is installed into the first electric motor 22.

The method further includes actuating one of the first torque transmitting mechanism 40, the second torque transmitting mechanism 42 and the third torque transmitting mechanism 44 to switch between the different operating modes, i.e., the first electric mode, the second electric mode and the third mode described in detail above. By actuating one or more of the first torque transmitting mechanism 40, the second torque transmitting mechanism 42 and the third torque transmitting mechanism 44, the powertrain 20 may operate in either the hybrid propulsion system or the full electric propulsion system.

While the best modes for carrying out the invention have been described in detail, those familiar with the art to which this invention relates will recognize various alternative designs and embodiments for practicing the invention within the scope of the appended claims.

The invention claimed is:

1. A powertrain for a vehicle, the powertrain comprising:
a first electric motor;
a second electric motor;
an internal combustion engine; and
a transmission including:
an output configured for transmitting a torque to at least one wheel of the vehicle;
a first planetary gearset connected to the output, the first electric motor and the internal combustion engine;
a second planetary gearset connected to the output and the second electric motor;
a first torque transmitting mechanism configured for selectively coupling and de-coupling the second planetary gearset to a stationary component of the transmission, wherein the first torque transmitting mechanism transmits torque between the stationary component and the second planetary gearset to provide a reaction torque to the second planetary gearset when the first torque transmitting mechanism is coupling the second planetary gearset and the stationary component to allow the second electric motor to transmit full power through the second planetary gearset to the output;
a second torque transmitting mechanism configured for selectively coupling and de-coupling the first electric motor and the second planetary gearset; and
a third torque transmitting mechanism configured for selectively coupling and de-coupling the first planetary gearset to the stationary component of the transmission, wherein the third torque transmitting mechanism transmits torque between the stationary component and the first planetary gearset to provide a reaction torque to the first planetary gearset when the third torque transmitting mechanism is coupling the first planetary gearset and the stationary component to allow the first electric motor to transmit full power through the first planetary gearset to the output when the internal combustion engine is off;
wherein the transmission is operable in a first electric mode with the first torque transmitting mechanism coupling the second planetary gearset and the stationary component, the third torque transmitting mechanism coupling the first planetary gearset and the stationary component, and the second torque transmitting mechanism de-coupling the first electric motor and the second planetary gearset to engage both the first electric motor and the second electric motor simultaneously to provide vehicle propulsion when the internal combustion engine is off;
wherein the transmission is operable in a second electric mode with the second torque transmitting mechanism de-coupling the first electric motor and the second planetary gearset, the first torque transmitting mechanism de-coupling the second planetary gearset and the stationary component, and the third torque transmitting mechanism coupling the first planetary gearset and the stationary component; and
wherein the transmission is operable in a third mode with the second torque transmitting mechanism de-coupling the first electric motor and the second planetary gearset, the first torque transmitting mechanism coupling the stationary component and the second planetary gearset, and the third torque transmitting mechanism de-coupling the first planetary gearset and the stationary component to provide vehicle propulsion from the second electric motor.

2. The powertrain as set forth in claim 1 wherein the first electric motor is configured for accepting one of a plurality of different winding sets to optimize performance in one of a hybrid propulsion configuration or a full electric propulsion configuration.

3. The powertrain as set forth in claim 2 wherein the plurality of winding sets includes a first winding set and a second winding set, with the first winding set configured to operate at a torque per amp ratio of at least 1.33 times greater than a torque to amp ratio of the second winding set.

4. The powertrain as set forth in claim 3 wherein the plurality of winding sets includes at least two winding sets, with each winding set having a different number of winding turns.

5. The powertrain as set forth in claim 3 wherein the plurality of winding sets includes at least two winding sets, with each winding set having a different winding connection configuration.

6. The powertrain as set forth in claim 5 wherein the plurality of winding sets includes at least one winding set having a delta pattern winding connection configuration and at least one winding set having a star pattern winding connection configuration.

7. The powertrain as set forth in claim 5 wherein the plurality of winding sets includes at least one winding set having a series winding connection configuration and at least one winding set having a parallel winding connection configuration.

8. The powertrain as set forth in claim 1 further comprising:
   a battery coupled to both the first electric motor and the second electric motor and configured for providing power to both of the first electric motor and the second electric motor, and configured for receiving power from at least one of the first electric motor and the second electric motor; and
   a controller coupled to the first electric motor, the second electric motor, the battery and the transmission, and configured for controlling the operation of the first electric motor, the second electric motor and the transmission, and configured for controlling the power flow between the battery, the first electric motor and the second electric motor.

9. A transmission for a vehicle having an internal combustion engine, a first electric motor and a second electric motor, the transmission comprising:
   an output configured for transmitting a torque to at least one wheel of the vehicle;
   a first planetary gearset configured to connect the output, the first electric motor and the internal combustion engine;
   a second planetary gearset configured to connect the output and the second electric motor;
   wherein the first planetary gearset and the second planetary gearset are each configured to provide independent fixed ratio paths to the output for the first electric motor and the second electric motor respectively;
   a first torque transmitting mechanism configured for selectively coupling and de-coupling the second planetary gearset to a stationary component, wherein the first torque transmitting mechanism transmits torque between the second planetary gearset and the stationary component to provide a reaction torque to the second planetary gearset when the first torque transmitting mechanism is coupling the second planetary gearset and the stationary component to allow the second electric motor to transmit full power through the second planetary gearset to the output;
   a second torque transmitting mechanism configured for selectively coupling and de-coupling the first electric motor and the second planetary gearset; and
   a third torque transmitting mechanism configured for selectively coupling and de-coupling the first planetary gearset to the stationary component, wherein the third torque transmitting mechanism transmits torque between the first planetary gearset and the stationary component to provide a reaction torque to the first planetary gearset when the third torque transmitting mechanism is coupling the first planetary gearset and the stationary component to allow the first electric motor to transmit full power through the first planetary gearset to the output when the internal combustion engine is off;
   wherein the first torque transmitting mechanism is coupling the second planetary gearset and the stationary component, the third torque transmitting mechanism is coupling the first planetary gearset and the stationary component, and the second torque transmitting mechanism is de-coupling the first electric motor and the second planetary gearset to operate in a first electric mode and engage both the first electric motor and the second electric motor simultaneously to provide vehicle propulsion when the internal combustion engine is off;
   wherein the second torque transmitting mechanism is de-coupling the first electric motor and the second planetary gearset, the first torque transmitting mechanism is de-coupling the second planetary gearset and stationary component, and the third torque transmitting mechanism is coupling the first planetary gearset and the stationary component when the transmission is operable in a second electric mode and provide vehicle propulsion from the first electric motor; and
   wherein the second torque transmitting mechanism is de-coupling the first electric motor and the second planetary gearset, the third torque transmitting mechanism is de-coupling the first planetary gearset and the stationary component, and the first torque transmitting mechanism is coupling the second planetary gearset and the stationary component to operate in a third mode and provide vehicle propulsion from the second electric motor.

10. A method of assembling a powertrain for a vehicle, the method comprising:
   providing a transmission having:
      an output configured for transmitting a torque to at least one wheel of the vehicle;
      a first planetary gearset in torque transmitting communication with the output, the first electric motor and the internal combustion engine;
      a second planetary gearset in torque transmitting communication with the output and the second electric motor;
      a first torque transmitting mechanism configured for selectively coupling and de-coupling the second planetary gearset to a stationary component, wherein the first torque transmitting mechanism transmits torque between the second planetary gearset and the stationary component to provide a reaction torque to the second planetary gearset when the first torque transmitting mechanism is coupling the second planetary gearset and the stationary component to allow the second electric motor to transmit full power through the second planetary gearset to the output;
      a second torque transmitting mechanism configured for selectively coupling and de-coupling the first electric motor and the second planetary gearset; and
      a third torque transmitting mechanism configured for selectively coupling and de-coupling the first planetary gearset to the stationary component, wherein the third torque transmitting mechanism transmits torque between the stationary component and the first planetary gearset to provide a reaction torque to the first planetary gearset when the third torque transmitting mechanism is coupling the first planetary gearset and the stationary component to allow the first electric motor to transmit full power through the first planetary gearset to the output when the internal combustion engine is off;
   identifying which one of a hybrid propulsion configuration or a full electric propulsion configuration is to be used to propel the vehicle; and
   installing one of a plurality of different winding sets into a first electric motor to optimize performance of the vehicle based upon which of the hybrid propulsion configuration or the full electric propulsion configuration is identified as to be used to propel the vehicle.

11. The method as set forth in claim 10 further comprising actuating one of the first torque transmitting mechanism, the second torque transmitting mechanism and the third torque transmitting mechanism to switch between different operating modes;

wherein the transmission is operable in a first electric mode with the third torque transmitting mechanism and the first torque transmitting mechanism engaged and the second torque transmitting mechanism disengaged to engage both the first electric motor and the second electric motor simultaneously to provide vehicle propulsion when the internal combustion engine is off;

wherein the transmission is operable in a second electric mode with the second torque transmitting mechanism and the first torque transmitting mechanism disengaged and the third torque transmitting mechanism engaged to provide vehicle propulsion with only the first electric motor when the internal combustion engine is off, and to disconnect the second electric motor from the first electric motor; and wherein the transmission is operable in a third mode with the second torque transmitting mechanism and the third torque transmitting mechanism disengaged and the first torque transmitting mechanism engaged to provide vehicle propulsion from the second electric motor.

12. The method as set forth in claim 10 further comprising selecting one of a plurality of winding sets for installation into the first electric motor based upon which of the hybrid propulsion configuration and the full electric propulsion configuration is identified as to be used to propel the vehicle.

13. The method as set forth in claim 12 wherein selecting one of a plurality of winding sets includes selecting one of at least two winding sets, with each winding set having a different number of winding turns.

14. The method as set forth in claim 12 wherein selecting one of a plurality of winding sets includes selecting one of at least two winding sets having a different winding connection configuration, wherein the different winding connection configurations may include a delta pattern winding connection configuration, a star pattern winding connection configuration, a series winding connection configuration or a parallel winding connection configuration.

* * * * *